United States Patent
Emery et al.

(10) Patent No.: US 10,395,671 B2
(45) Date of Patent: Aug. 27, 2019

(54) DYNAMICALLY PROVIDING TO A PERSON FEEDBACK PERTAINING TO UTTERANCES SPOKEN OR SUNG BY THE PERSON

(71) Applicant: International Business Machines Corporation, Armonk, NY (US)

(72) Inventors: Alan D. Emery, North Richland Hills, TX (US); Aditya Sood, Philadelphia, PA (US); Mathews Thomas, Flower Mound, TX (US); Janki Y. Vora, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/721,946

(22) Filed: Oct. 1, 2017

(65) Prior Publication Data
US 2018/0025742 A1    Jan. 25, 2018

Related U.S. Application Data

(63) Continuation of application No. 15/134,442, filed on Apr. 21, 2016, now Pat. No. 9,779,761, which is a
(Continued)

(51) Int. Cl.
*H04R 3/00*  (2006.01)
*G10L 15/10*  (2006.01)
(Continued)

(52) U.S. Cl.
CPC .............. *G10L 25/60* (2013.01); *G10L 15/10* (2013.01); *G10L 15/30* (2013.01); *G10L 25/51* (2013.01);
(Continued)

(58) Field of Classification Search
CPC ....................................................... G10L 21/06
See application file for complete search history.

(56) References Cited

U.S. PATENT DOCUMENTS 7,549,120 B1   6/2009   Griffith et al.
9,344,821 B2   5/2016   Emery et al.
(Continued)

FOREIGN PATENT DOCUMENTS

EP    1818912 A1   8/2007
GB    2345183 A1   6/2000
(Continued)

OTHER PUBLICATIONS

"Decibel 10th on the App Store on iTunes," SkyPaw Co. Ltd., updated Oct. 3, 2013 [retrieved Dec. 12, 2013 ] retrieved from the Internet: <https://itunes.apple.com/us/app/decibel-10th/id448155923?mt=8[Dec. 12, 2013 12:22:39 PM]>, 3 pg.
(Continued)

*Primary Examiner* — Brian L Albertalli
(74) *Attorney, Agent, or Firm* — Cuenot, Forsythe & Kim, LLC (57) ABSTRACT

Utterances spoken or sung by a first person can be received, in real time, from a mobile communication device. A location of the mobile communication device can be determined to be in an area designated as a quiet zone. A key indicator that indicates at least one characteristic of the detected utterances spoken or sung by the first person can be generated. Based, at least in part, on the key indicator, a determination can be made that the first person is speaking or singing too loudly in the area designated as the quiet zone. Responsive to determining that the first person is speaking or singing too loudly in the area designated as the quiet zone, feedback indicating that the first person is speaking or
(Continued)

singing too loudly in the area designated as the quiet zone can be communicated to the mobile communication device.

20 Claims, 5 Drawing Sheets

Related U.S. Application Data continuation of application No. 14/222,137, filed on Mar. 21, 2014, now Pat. No. 9,344,821.

(51) Int. Cl.
| | | |
|---|---|---|
| *G10L 15/22* | (2006.01) | |
| *G10L 15/30* | (2013.01) | |
| *G10L 25/60* | (2013.01) | |
| *G10L 25/51* | (2013.01) | |
| *G10L 25/72* | (2013.01) | |
| *H04R 27/00* | (2006.01) | |
| *G10L 17/22* | (2013.01) | |
| *H04R 3/04* | (2006.01) | |

(52) U.S. Cl.
CPC ............. *G10L 25/72* (2013.01); *H04R 3/00* (2013.01); *H04R 27/00* (2013.01); *G10L 17/22* (2013.01); *G10L 2015/225* (2013.01); *H04R 3/04* (2013.01); *H04R 2227/001* (2013.01); *H04R 2227/007* (2013.01); *H04R 2430/01* (2013.01)

(56) References Cited

U.S. PATENT DOCUMENTS

| | | | |
|---|---|---|---|
| 9,779,761 | B2 | 10/2017 | Emery et al. |
| 2003/0202007 | A1 | 10/2003 | Silverstein et al. |
| 2003/0227479 | A1 | 12/2003 | Mizrahi et al. |
| 2008/0256613 | A1 | 10/2008 | Grover |
| 2009/0137257 | A1 | 5/2009 | Barber |
| 2009/0138332 | A1 | 5/2009 | Kanevsky et al. |
| 2009/0165634 | A1 | 7/2009 | Mahowald |
| 2009/0284950 | A1 | 11/2009 | Rubio et al. |
| 2009/0326942 | A1 | 12/2009 | Fulop |
| 2011/0082698 | A1 | 4/2011 | Rosenthal |
| 2011/0144993 | A1 | 6/2011 | Ruby |
| 2011/0295392 | A1 | 12/2011 | Cunnington et al. |
| 2013/0041661 | A1 | 2/2013 | Lee et al. |
| 2013/0227420 | A1 | 8/2013 | Pasquero et al. |
| 2014/0082485 | A1 | 3/2014 | Deluca et al. |
| 2014/0089960 | A1 | 3/2014 | Farah |
| 2014/0109210 | A1 | 4/2014 | Borzycki et al. |
| 2014/0136626 | A1 | 5/2014 | Teevan et al. |
| 2014/0205116 | A1 | 7/2014 | Smith et al. |
| 2014/0237371 | A1 | 8/2014 | Klemm et al. |
| 2014/0253437 | A1 | 9/2014 | Vaught et al. |
| 2015/0269929 | A1 | 9/2015 | Emery et al. |
| 2016/0232921 | A1 | 8/2016 | Emery et al. |

FOREIGN PATENT DOCUMENTS

| | | |
|---|---|---|
| WO | 0070783 A1 | 11/2000 |
| WO | 2012152323 A1 | 11/2012 |
| WO | 2013126984 A1 | 9/2013 |

OTHER PUBLICATIONS

"TooLoud? on the App Store on iTunes," RGB-Studio, updated Nov. 21, 2011 [retrieved Dec. 12, 2013] retrieved from the Internet: <https://itunes.apple.com/us/app/tooloud/id393039065?mt=8[Dec. 12, 2013 12:05:34 PM]>, 3 pg.

"A Noise Level Meter Built for the Classrom—Too Noisy ," © 2012 Too Noisy [retrieved Dec. 12, 2013] retrieved from the Internet: <http://toonoisyapp.com/[Dec. 12, 2013 12:28:05 PM]>, 2 pg.

"Voice-O-Meter on the App Store on iTunes," Use Your Noodle, LLC, updated Jan. 23, 2013 [retrieved Dec. 12, 2013] retrieved from the Internet: (https://itunes.apple.com/us/app/voice-o-meter/id590404906?mt=8[Dec. 12, 2013 12:23:57 PM]., 3 pg.

U.S. Appl. No. 14/222,137, Non-Final Office Action, dated Sep. 15, 2015, 15 pg.

U.S. Appl. No. 14/222,137, Notice of Allowance, dated Feb. 17, 2016, 5 pg.

U.S. Appl. No. 15/134,442, Non-Final Office Action, dated Jul. 14, 2016, 14 pg.

U.S. Appl. No. 15/134,442, Non-Final Office Action, dated Jan. 10, 2017, 11 pg.

U.S. Appl. No. 15/134,442, Notice of Allowance, dated May 26, 2017, 5 pg.

DYNAMICALLY PROVIDING TO A PERSON FEEDBACK PERTAINING TO UTTERANCES SPOKEN OR SUNG BY THE PERSON

BACKGROUND

Arrangements described herein relate to providing to processing audio signals generated by a presenter.

When a person is speaking or singing to a large audience, generally it is desirable that all people in the audience clearly hear the speaker. To that extent, a public address (PA) system oftentimes, but not always, is used to convey the speech to the audience. A PA system is an electronic sound amplification and distribution system that includes a microphone, an amplifier and loudspeakers that are used to detect, amplify and propagate speech and other audio. It is not uncommon for a PA system also to include a sound board which is used to adjust and optimize presentation of the speech to the audience. For example, a person controlling the sound board can listen to the speaker through the PA system and adjust the level of audio amplification and audio equalization applied to the audio to achieve a desired sound level and tone.

SUMMARY

A method includes receiving, in real time, from a mobile communication device, utterances spoken or sung by a first person, wherein the mobile communication device detects the utterances spoken or sung by the person when the utterances are spoken or sung. The method also can include determining that a location of the mobile communication device is in an area designated as a quiet zone. The method also can include generating, using a processor, a key indicator that indicates at least one characteristic of the detected utterances spoken or sung by the first person. The method also can include, based, at least in part, on the key indicator, determining that the first person is speaking or singing too loudly in the area designated as the quiet zone. The method also can include, responsive to determining that the first person is speaking or singing too loudly in the area designated as the quiet zone, communicating to the mobile communication device feedback indicating that the first person is speaking or singing too loudly in the area designated as the quiet zone, wherein the mobile communication device is configured to present the feedback to the first person or a second person.

A system includes a processor programmed to initiate executable operations. The executable operations include receiving, in real time, from a mobile communication device, utterances spoken or sung by a first person, wherein the mobile communication device detects the utterances spoken or sung by the person when the utterances are spoken or sung. The executable operations also can include determining that a location of the mobile communication device is in an area designated as a quiet zone. The executable operations also can include generating a key indicator that indicates at least one characteristic of the detected utterances spoken or sung by the first person. The executable operations also can include, based, at least in part, on the key indicator, determining that the first person is speaking or singing too loudly in the area designated as the quiet zone. The executable operations also can include, responsive to determining that the first person is speaking or singing too loudly in the area designated as the quiet zone, communicating to the mobile communication device feedback indicating that the first person is speaking or singing too loudly in the area designated as the quiet zone, wherein the mobile communication device is configured to present the feedback to the first person or a second person.

A computer program product includes a computer readable storage medium having program code stored thereon, the program code executable by a processor to perform a method. The method includes receiving, in real time, from a mobile communication device, utterances spoken or sung by a first person, wherein the mobile communication device detects the utterances spoken or sung by the person when the utterances are spoken or sung. The method also can include determining that a location of the mobile communication device is in an area designated as a quiet zone. The method also can include generating, by the processor, a key indicator that indicates at least one characteristic of the detected utterances spoken or sung by the first person. The method also can include, based, at least in part, on the key indicator, determining that the first person is speaking or singing too loudly in the area designated as the quiet zone. The method also can include, responsive to determining that the first person is speaking or singing too loudly in the area designated as the quiet zone, communicating to the mobile communication device feedback indicating that the first person is speaking or singing too loudly in the area designated as the quiet zone, wherein the mobile communication device is configured to present the feedback to the first person or a second person.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to dynamically providing to a person feedback pertaining to audio generated by the person or another person. In illustration, when a person is speaking or singing to a large audience, mobile communication devices used by members of the audience and/or sensors can detect audio generated by the person, including utterances spoken or sung by the person. The detected utterances can be compared to a stored sample of utterances spoken or sung by the person. Based on this comparison, a key indicator can be generated. The key indicator can indicate at least one characteristic of the detected audio. For example, the key indicator can indicate the person is speaking or singing too loudly, the person is speaking or singing to softly, the person is speaking or singing too fast, the person is not properly annunciating his/her words, the person is speaking or singing in too high or too low of a tone, or the like. Feedback based on the key indicator can be communicated to the person, thereby indicating to the person whether the person should change the manner in which the person is speaking or singing and, if so, how the person should change the manner in which he/she is speaking or singing. In lieu of, or in addition to, communicating the feedback to the person, the feedback can be communicated to another person, such as a person controlling presentation of the audio via a public address (PA) system.

In another arrangement, when a person is speaking or singing in an area designated as a quiet zone, a mobile communication device used by the person, or a mobile communication device used by another who is proximate to the person, can detect utterances spoken or sung by the person. The detected utterances can be compared to stored samples of utterances spoken or sung by various people, including the person who is speaking or singing, to identify the person who is speaking or singing and generate a key indicator. Again, the key indicator can indicate at least one characteristic of the detected utterances spoken or sung by the person. For example, the key indicator can indicate whether the person is speaking or singing too loudly in the quiet zone. Feedback based on the key indicator can be communicated to the person. For instance, the key indicator can indicate to the person that the person is speaking or singing to loudly in the quiet zone. In response, the speaker can take appropriate action, for example by lowering the volume of speech or moving the discussion to another location.

Several definitions that apply throughout this document now will be presented.

As defined herein, the term "key indicator" means an indicator that indicates at least one characteristic of the audio by the person. Examples of such characteristics include, but are not limited to, volume of the audio, volume of the audio relative to background noise, tone of the audio, pace of the audio, clarity of the audio and quality of word annunciation.

As defined herein, the term "feedback" means information provided to a person regarding in response to information provided by the person or an action performed by the person. Examples of information provided by a person include, but are not limited to, spoken or sung utterances, vocalizations of the person and other actions by the person that create sound.

As defined herein, the term "utterance" means a word spoken by a person or sung by a person.

As defined herein, the term "real time" means a level of processing responsiveness that a user or system senses as sufficiently immediate for a particular process or determination to be made, or that enables the processor to keep up with some external process.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC) and a controller.

As defined herein, the term "automatically" means without user intervention.

As defined herein, the term "user" means a person (i.e., a human being).

Figure 1:
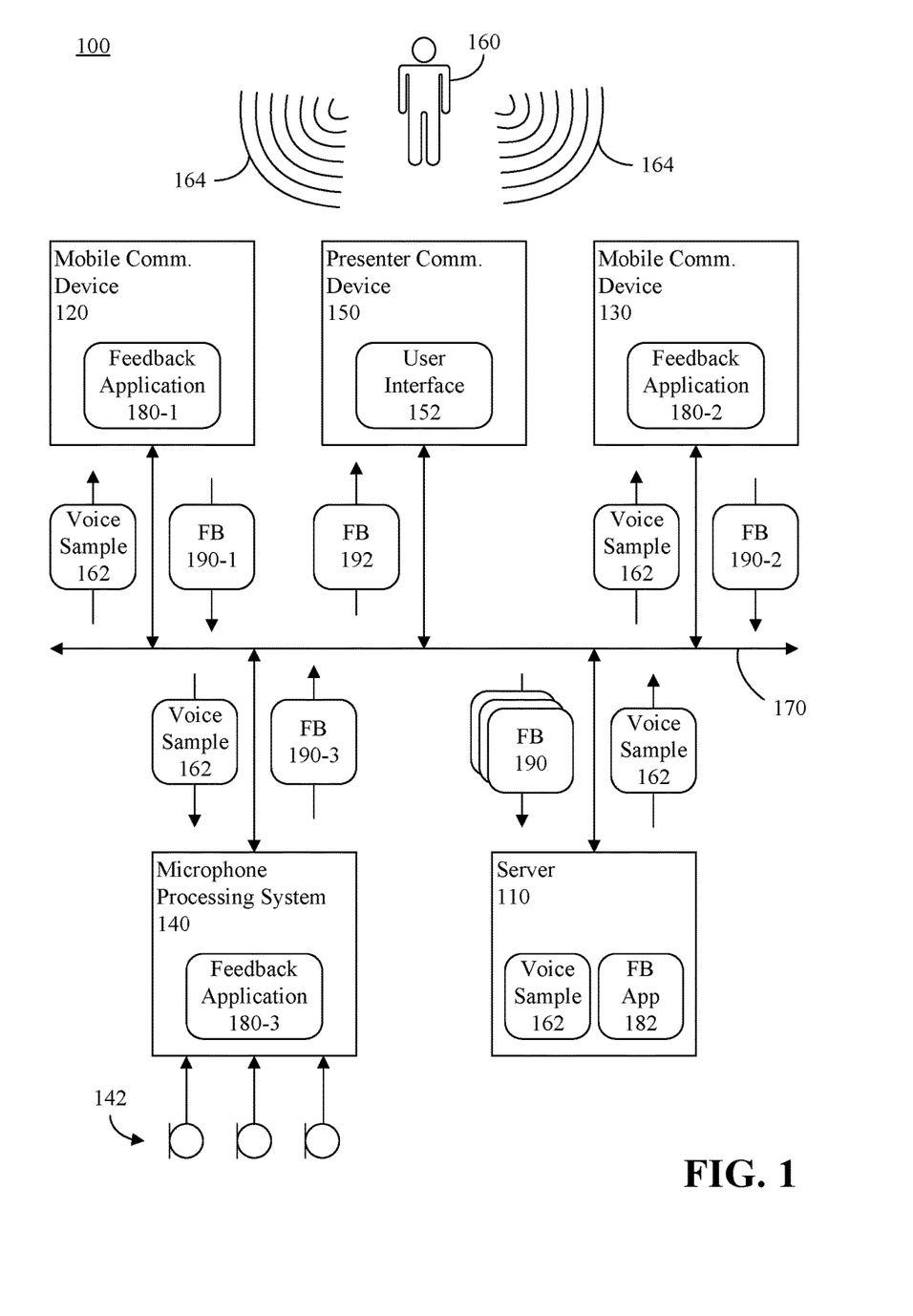
FIG. 1 is a block diagram illustrating an example of a communication system.

FIG. 1 is a block diagram illustrating an example of a communication system (hereinafter "system") 100. The system 100 can include a server 110, one or more mobile communication devices 120, 130 used by members of an audience, an microphone processing system 140 coupled to one or more discrete microphones 142, and a presenter communication device 150 used by a person 160 generating and/or presenting audio to the audience. Optionally, the system 100 also can include a PA system (not shown) to facilitate conveyance of audio generated or presented by the person 160 to the audience. PA systems are well known to those of ordinary skill in the art.

The server 110, mobile communication devices 120, 130, microphone processing system 140 and the presenter communication device 150 each can be implemented as a respective processing system including at least one processor and memory. Examples of a mobile communication device 120, 130 include, but are not limited to, a mobile computer (e.g., a laptop computer, a notebook computer, a netbook computer, a tablet computer, a wearable computer, etc.), a smart phone, a personal digital assistant, and the like. Each mobile communication device 120, 130 can include at least one microphone. Examples of the microphone processing system 140 include, but are not limited to, an input audio controller, a mixing board, and the like. In another arrangement, the microphone processing system 140 can be a component of the server 110. Examples of the presenter communication device 150 include a computer, a mobile communication device, a teleprompter, and the like.

The server 110 can be communicatively linked to the mobile communication devices 120, 130, the microphone processing system 140, and the presenter communication device 150, via one or more suitable communication networks 170. Optionally, the mobile communication devices 120, 130 and microphone processing system 140 can be communicatively linked to the presenter communication device 150 via the communication network(s) 170. The communication network 170 is the medium used to provide communications links between various devices and data processing systems connected together within system 100. The communication network 170 may include connections, such as wire, wireless communication links, or fiber optic cables. The communication network 170 can be implemented as, or include, any of a variety of different communication technologies such as a wide area network (WAN), a local area network (LAN), a personal area network (PAN), a wireless network, a mobile network, a Virtual Private Network (VPN), the Internet, the Public Switched Telephone Network (PSTN), or the like.

The server 110 can store a voice sample 162 of the person 160. In one aspect, the voice sample 162 can be a digital voice sample. For example, prior to starting a presentation in which the person 160 will be speaking or singing, the person 160 can record his/her voice and upload the voice sample 162 to the server. In one arrangement, the person 160 can record his/her voice (e.g., utterances spoken or sung by the person 160) via the presenter communication device 150, though the present arrangements are not limited in this regard. Further, the server 110 can be trained with the person's voice sample 162 and generate corresponding training information that can be used to identify the person when the person is speaking or singing. Such training information can be stored with the voice sample 162 and communicated with the voice sample 162 when the voice sample is shared with other devices/systems. Further, metadata can be included in the voice sample 162 and/or training information, such as user name, user identifier, device identifier, geo location information, profile information, an image sample, etc.

In operation, one or more of the mobile communication devices 120, 130 and microphone processing system 140 can receive from the server 110 the voice sample 162 of the person 160 and store the voice sample 162 locally on the respective mobile communication devices 120, 130. For example, prior to, when or after the person 160 begins speaking, singing or otherwise presenting audio to the audience, members of the audience can use their mobile communication devices 120, 130 to navigate to a website or web portal from which the voice sample 162 can be downloaded. In another arrangement, the voice sample 162 can be provided to the audience members as an attachment to a message, such as an e-mail or text message, which the audience members can open to retrieve the voice sample 162 and store the voice sample, at least temporarily, on their respective mobile communication devices 120, 130. If the microphone processing system 140 is not a component of the server 110, a person administering the microphone processing system 140 can retrieve the voice sample 162 in a similar manner, or the server 110 can push the voice sample 162 to the microphone processing system 140.

Further, one or more of the mobile communication devices 120, 130 and microphone processing system 140 can include a feedback application 180 configured to compare detected utterances spoken or sung by the person 160 to the voice sample 162, as will be described. The feedback application 180 can be received from the server 110 by the respective mobile communication devices 120, 130 and microphone processing system 140, for example as previously described with respect to the voice sample 162, or can otherwise be installed on the mobile communication devices 120, 130 and microphone processing system 140. In one arrangement, the feedback application 180 can be configured to be in an auto-notification mode wherein the feedback application 180 automatically generates feedback when audio is detected, or a manual mode in which a user activates and deactivates the feedback application 180 when desired.

During the presentation, the person 160 can generate and/or otherwise present audio 164, which can include utterances spoken or sung by the person 160 during the presentation. The mobile communication devices 120, 130 can automatically detect the audio 164 via their respective microphones, or microphones to which the mobile communication devices 120, 130 are communicatively linked, and provide the audio 164 to the respective feedback application 180-1, 180-2 executing on the respective mobile communication devices 120, 130. Similarly, the microphone processing system 140 can automatically detect the audio 164 via the respective microphones 142, and provide the audio 164 to the respective feedback application 180-3 executing on the microphone processing system 140 (or the server 110 if the microphone processing system 140 is a component of the server).

Each instance of the feedback application 180 executing on the respective the mobile communication devices 120, 130 and microphone processing system 140 can process the detected audio 164 to generate a key indicator that indicates at least one characteristic of the detected audio 164. As noted, examples of such a characteristic include, but are not limited to, volume of the audio, volume of the audio relative to background noise, tone of the audio, pace of the audio, clarity and quality of word annunciation.

In illustration, each instance of the feedback application 180 can identify in the detected audio 164 and/or filter from the detected audio 164 utterances spoken or sung by the person 160. In one aspect, such filtering can include processing the voice sample 162. Further, the feedback application can compare the utterances spoken or sung by the person 160 to previous utterances spoken or sung by the person 160 contained in the voice sample 162 and, based at least on this comparison, generate the key indicator. For example, if the person is speaking or singing at a pace in the detected audio 164 that is faster than a pace the person spoke or sung in the voice sample 162, the key indicator can indicate that the person is speaking or singing to fast in the presentation. If the volume of the detected audio 164 is low compared to the volume of the person's voice in the voice sample 162, or the volume of the detected audio 164 is low compared to background noise, the key indicator can indicate the person 160 is speaking too softly and should increase the volume of the audio 164, speak/sing closer to a microphone, or the volume of the PA system should be increased. If the volume of the detected audio 164 is high compared to the volume of the person's voice in the voice sample 162, the key indicator can indicate the person 160 is speaking too softly and should decrease the volume of the audio 164, speak/sing farther away from a microphone, or the volume of the PA system should be decreased. If word annunciation in the detected audio 164 is lower than the quality of word annunciation contained in the voice sample 162, the key indicator can indicate the person 160 needs to better annunciate his/her words.

Further, members of the audience can use the feedback application 180 on their respective mobile communication devices 120, 130 to manually enter user inputs via a suitable user interface presented by the feedback application 180. The user inputs can indicate characteristics of the audio 164 as perceived by the audience members. For example, audience members can be provided selectable and/or adjustable controls to rate the volume, pace, tone, clarity and/or word annunciation of audio presented by the person 160. Such user inputs also can be processed to generate the key indicator. In one aspect, the feedback 190 can be provided anonymously so that users will not be inhibited from being honest with their user inputs. Further, user preferences can be stored in the feedback application 180, and the user preferences can be dynamically (automatically) changed when changes in the location of the mobile communication devices 120, 130 and/or environment in which the mobile communication devices 120, 130 are located are detected. Such changes in the environment can be, for example, changes in levels of background noise, etc.

From the key indicator, each instance the feedback application 180 can generate respective feedback 190-1, 190-2, 190-3 indicating the characteristic(s) of the detected audio 164 determined by the respective instances of the feedback application 180 and/or user inputs received from audience members. In one arrangement, each respective feedback 190-1, 190-2, 190-3 can indicate a respective location of the corresponding mobile communication device 120, 130/microphone 142. For example, each mobile communication device 120, 130 can include a global positioning system (GPS) receiver, or other suitable device/system, used to determine the location of the mobile communication device 120, 130. In another example, a mobile communication device 120, 130 can communicate with other devices/systems, such as wireless access points, routers, etc., to determine its present location. The feedback application 180 can process the location information to determine where, in a room, conference hall, building or stadium, the mobile communication device 120, 130 is located, and indicate such in the feedback 190-1, 190-2 generated for that mobile communication device 120, 130. For example, the feedback 190-1 can indicate that the volume of the audio 164 is too low in the left-rear portion of the conference hall. Further, the microphone processing system 140 can access information indicating where each microphone 142 is located. The location of a particular microphone 142 can be indicted in feedback 190-3 generated based on the audio 164 as detected by that particular microphone 142. For example, the feedback 190-3 can indicate that the volume of the audio 164 is too high in the center-front portion of the room. Accordingly, when large audiences are present, different areas where audience members are located can be identified and presentation of the audio 164 to the different areas can be selectively controlled to optimize the listening experience in each area.

In one arrangement, each respective feedback 190-1, 190-2, 190-3 can be communicated as feedback 192 from the respective mobile communication devices 120, 130 and microphone processing system 140 to the presenter communication device 150. In another arrangement, the feedback 190 can be communicated from the respective mobile communication devices 120, 130 and microphone processing system 140 to the server 110, and a feedback application 182 executed by the server 110 can process and aggregate the feedback 190 to generate feedback 192 that is communicated to the presenter communication device 150. In illustration, at least some of the respective feedback 190-1, 190-2, 190-3 can be similar. The feedback application 182 can consolidate the feedback 190 into feedback 192 that is quickly and easily comprehended by the person 160 while the person is presenting the audio 164.

If there is a large number of audience members, and only a small number of the audience members provide feedback 190 indicating that the volume of the audio 164 is too low, the feedback application 182 need not communicate the feedback 192 to the presenter communication device 150, or may wait to do so until more audience members provide feedback 190 indicating the volume of the audio 164 is too low. In this regard, a feedback threshold may be required before the feedback 192 is generated. Further, feedback 190 from some audience members located in a particular area may indicate the volume of the audio is too low, while feedback 190 from other audience members located in that particular area may indicate the volume of the audio is too high. In such case, the feedback application 182 can evaluate the feedback 190 to determine whether more of the feedback indicates the volume is too low or more of the feedback indicates the volume is too high. The feedback application 182 can apply a suitable algorithm to determine whether to generate the feedback 192 based on the received feedback 190, and if so, whether the feedback 192 suggests increasing or lowering the volume. For example, if the feedback 190 indicates twice as many mobile communication devices 120, 130/audience members indicate the volume is too low as compared to the number of mobile communication devices 120, 130/audience members indicating the volume is too high, the feedback application 182 can generate the feedback 192 indicating the volume is too low. Further, the feedback application 182 can selectively process feedback 190 received within a particular period, or window, when determining whether to generate the feedback 192 and the content of the feedback 192.

Responsive to receiving the feedback 192, a user interface 152 of the presenter communication device 150 can present the feedback 192 to the person 160 who is presenting the audio 164. Accordingly, based on the feedback 192, the person 160 can adjust the manner in which the person is speaking or singing to better convey the person's speech or song. In one arrangement, the feedback 192 can be presented on a display or teleprompter viewable by the person 160. In another arrangement, the feedback 192 can be audibly presented to the person 160, for example via an audio earpiece worn by the person 160.

In one aspect, the feedback 192 can be presented via the person's mobile communication device, which also can execute an instance of the feedback application 180. In this regard, the user interface 152 can be presented by the feedback application 180. Further, the feedback application 180 can include a user selectable option that allows the person 160 to choose whether the person 160 is a presenter or audience member. If the person 160 selects to be a presenter, the feedback application 180 can present to the person 160 feedback from other users (e.g., audience members). If the person 160 selects to be an audience member, the feedback application can generate feedback as previously described. In one aspect, the feedback application can require that the person 160 register with the server 110 as a presenter before the feedback application 180 allows the person 160 to choose to be a presenter. When the person 160 is registered as a presenter, the server 110 can communicate a message to other feedback applications 180-1, 180-2, 180-3 indicating that the person 160 is the presenter, in which case the other feedback applications 180-1, 180-2, 180-3 can filter the detected audio 164, based at least in part on the voice sample 162, to isolate the presenters utterances from other voices and background noise.

In another aspect of the present arrangements, rather than communicating the feedback 192 to the presenter communication device 150, or in addition to doing so, the feedback 192 can be communicated to another person (not shown), such as a person in charge of controlling a PA system via which the audio 164 is delivered to the audience members. Based on the feedback 192, that other person can adjust the manner in which the audio 164 is presented over the PA system. For example, the person can adjust the volume at which the audio 164 is presented or one or more areas of a room, conference hall, building, or stadium, equalize the audio 164 to adjust the tone of the audio, etc. In yet another arrangement, the feedback 192 can be communicated to the PA system, for example to a computer controlled sound board controlling the PA system, and the PA system can automatically adjust the volume at which the audio 164 is presented or one or more areas of a room, conference hall, building, or stadium, equalize the audio 164 to adjust the tone of the audio, etc.

Figure 2:
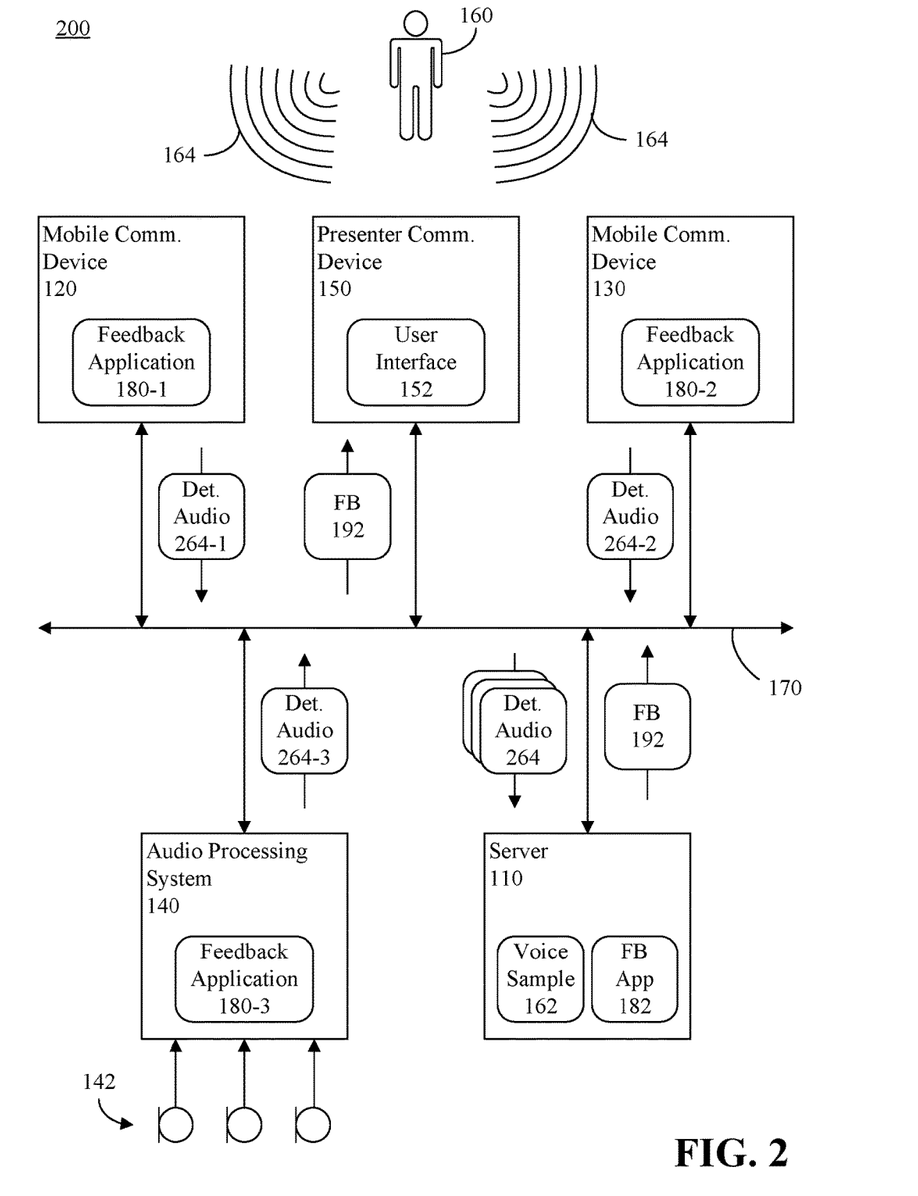
FIG. 2 is a block diagram illustrating another example of a communication system.

FIG. 2 is a block diagram illustrating another example of a communication system (hereinafter "system") 200. The system 200 can include the server 110, the mobile communication devices 120, 130, the microphone processing system 140, the microphones 142, the presenter communication device 150, and the communication network(s) 170 depicted in, and discussed with reference to, FIG. 1. In the system 200 of FIG. 2, rather than the feedback application 180 generating the key indicator and the feedback, the respective instances of the feedback application 180-1, 180-2, 180-3 can communicate to the server 110, as detected audio 264-1, 264-2, 264-3, the audio 164 presented by the person 160 and detected by the respective mobile communication devices 120, 130 and microphone processing system 140. The mobile communication devices 120, 130 also can communicate to the server 110 location information indicating the respective locations of the mobile communication devices 120, 130, and the microphone processing system 140 can communicate to the server location information indicating the respective locations of the microphones 142, for example as previously described. The location information can be associated with the respective detected audio 264-1, 264-2, 264-3, for example as previously described with regard to associating location information with the feedback 190 of FIG. 1. The feedback application 182 can filter the detected audio 264 using the voice sample 162 to isolate the utterances of the person 160 from other voices and background noise.

Further, the feedback application 182 can generate the key indicator that indicates at least one characteristic of the detected audio 164. In one arrangement, in addition to the detected audio 264, the feedback application 180-1, 180-2 on the mobile communication devices 120, 130 can receive user inputs from respective audience members related to characteristics of the audio 164 as perceived by the audience members, and can communicate corresponding data to the server 110. The feedback application 182 can generate the key indicator in the same manner previously described with reference to operations performed by the feedback application 180 in FIG. 1. Further, based on the key indicator, the feedback application 182 can generate the feedback 192 indicating the characteristic(s) of the detected audio 164 and communicate the feedback 192 to the presenter communication device 150 for presentation to the person 160 by the user interface 152. As noted, the user interface 152 can be presented by a feedback application executing on the presenter communication device 150. In another aspect, the feedback application 182 can communicate the feedback 192 to another person (not shown), such as a person in charge of controlling a PA system via which the audio 164 is delivered to the audience members. In yet another aspect, the feedback application 182 can communicate the feedback 192 to the PA system which, as noted, can automatically adjust the volume at which the audio 164 is presented or one or more areas of a room, conference hall, building, or stadium, equalize the audio 164 to adjust the tone of the audio, etc.

Figure 3:
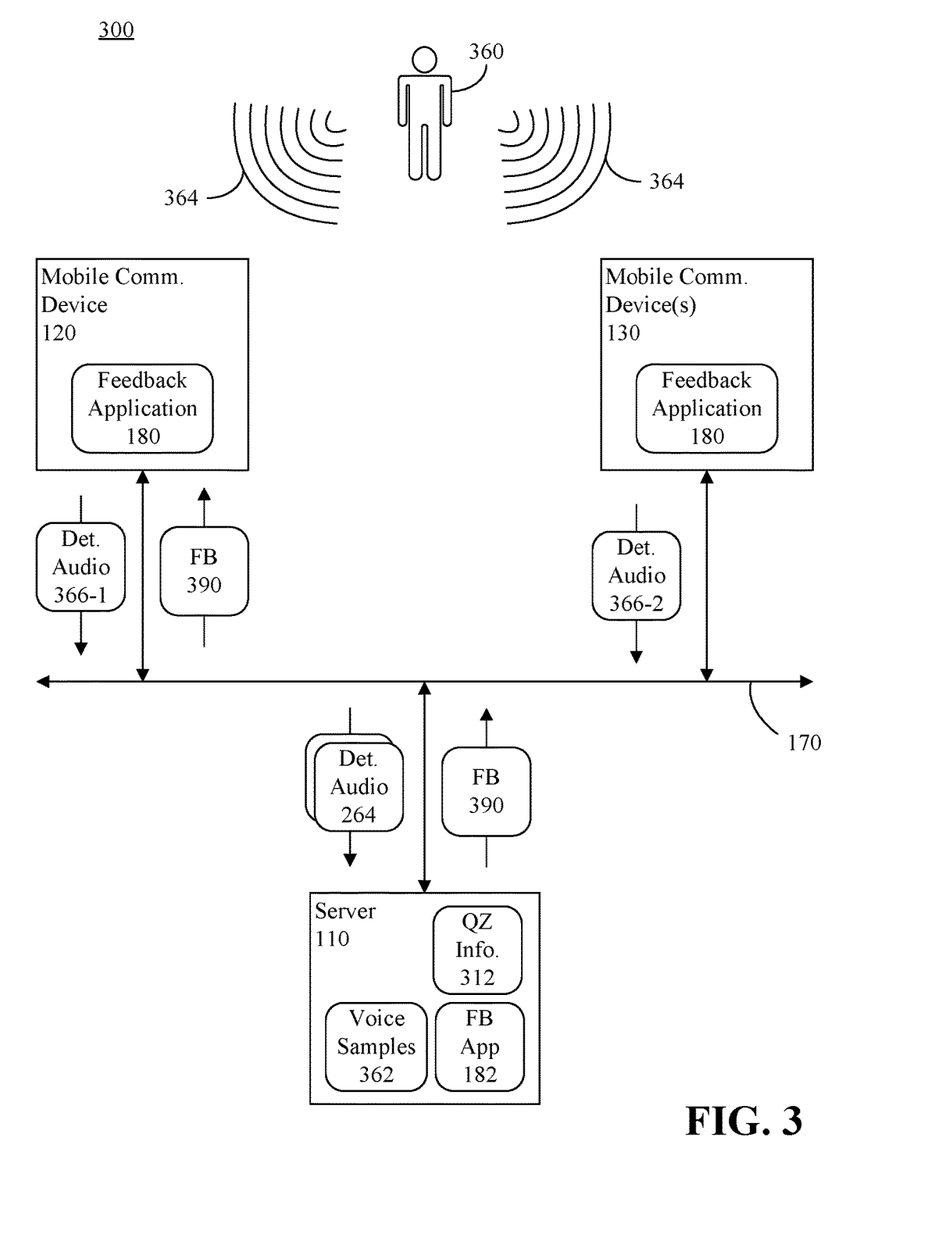
FIG. 3 is a block diagram illustrating another example of a communication system.

FIG. 3 is a block diagram illustrating another example of a communication system (hereafter "system") 300. The system 300 can include the server 110, the mobile communication devices 120, 130 and the communication network(s) 170 depicted in, and discussed with reference to, FIGS. 1 and 2. In the system 300 of FIG. 3, the respective instances of the feedback application 180-1, 180-2 executing on the mobile communication devices 120, 130 can communicate to the server 110, as detected audio 366-1, 366-2, audio 364 (e.g., utterances) presented by a person 360 and detected by one the respective mobile communication devices 120, 130. Further, the mobile communication devices 120, 130 can communicate to the server 110 location information indicating the respective locations of the mobile communication devices 120, 130, for example as previously described.

The feedback application 182 can process the detected audio 366 to identify the person 360. In illustration, for each person that participates in the system 300, the server 110 can receive a respective voice sample 362 which includes utterances spoken or sung by the respective people. The feedback application 182 can process the voice samples 182 in order to generate voice identification data configured to be processed to recognize the individual people based on detected utterances spoken or sung by the people. Thus, when the detected audio 366 is received, the feedback application 182 can identify the person 360 based on the detected audio and the voice identification data generated for that person 360.

Further, the feedback application 182 can identify the mobile communication device 120 used by the person 360. The feedback application 182 also can compare the location information received from the mobile communication device 120 with quiet zone information 312 to determine whether the person 360 presently is located in an area designated as a quiet zone. If the person 360 presently is located in an area designated as a quiet zone, the feedback application 182 can process the detected audio 366 to generate a key indicator that indicates a volume of the audio 364. Further, the feedback application can compare the key indicator to a threshold value for a maximum volume level assigned to the area, and determine whether the volume of the audio 364 is above the threshold value (i.e., too loud for the area designated as the quiet zone). If so, the feedback application 182 can generate feedback 390 indicating the person 360 is being too loud and communicate the feedback 390 to the mobile communication device 120 of the person 360. The feedback application 180 on that mobile communication device 120 can present the feedback 390 to the person 360. For example, the feedback application 180 can present the feedback 390 via a user interface presented on the mobile communication device, via an audible notification presented by the mobile communication device 120, or via a haptic response (e.g., vibration or series of vibrations) presented by mobile communication device 120. Accordingly, the person 360 is notified that he/she is too loud for the quiet zone and can lower the volume of audio 364 he/she is generating.

In one arrangement, an area can be automatically designated as a quiet zone by the feedback application 182 if a person (e.g., a person other than the person 360) is designated as a presenter in that area. The person who is the presenter in that area can be assigned a higher volume threshold than other people in that area. Accordingly, if an the person 360 is an audience member and speaks too loudly, or otherwise makes too much noise, while another person is presenting, the person 360 can be notified the he/she is speaking too loudly during the presentation.

An area also can be designated as a quiet zone by a user. For example, if the person 360 is conducting a meeting in a first office and discussing confidential information, and a client, customer or other person who is not authorized to listen to the meeting enters another office proximate to the first office, a staff member can access a feedback application 180 on the staff members communication device to update the quiet zone information 312 in order to designate the first office as a quiet zone. For example, the feedback application 180 can communicate a corresponding message to the feedback application 182. Accordingly, if the person 360 speaks too loudly when the first office is designated as a quiet zone, the feedback application can generate feedback 390 informing the person 360 that he/she should speak quietly about confidential information.

In another aspect, a person 360 may desire to made aware of whether he/she potentially is distracting other people, for example if the person 360 works in an office where personnel work in cubicles. In this case, the person 360 can access the feedback application 180 on the person's mobile communication device 120 and enter a user input selecting a corresponding user selectable option to monitor the volume of the person's utterances as perceived by other mobile communication devices 130. The feedback application 180 can communicate a message to the feedback application 182. Accordingly, the feedback application 182 can monitor detected audio 366-2 received from the other mobile communication devices 130 and identify audio 364 generated by the person 360 as previously described. If the key indicator indicates that the detected audio 366-2 is above a threshold level, the feedback application 182 can generate the feedback 390 and communicate the feedback 390 to the mobile communication device 120 to indicate to the person that the volume of the audio 364 generated by the person 360 is too high.

Figure 4:
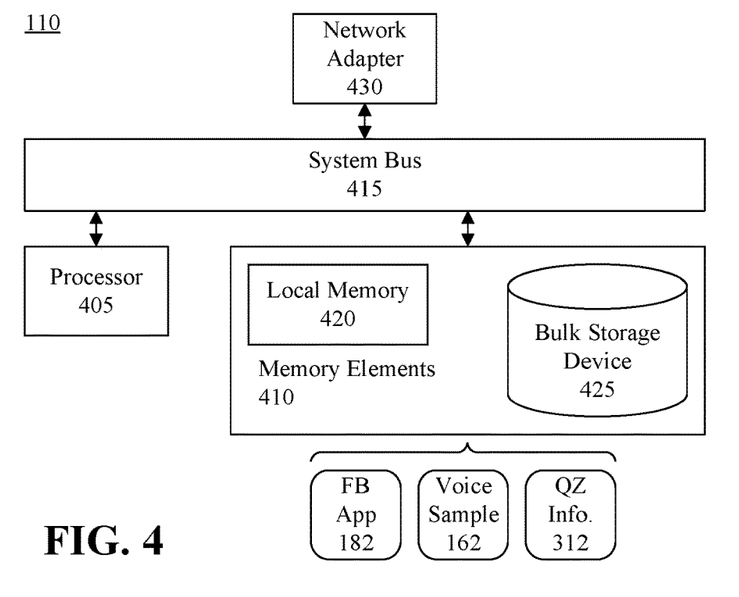
FIG. 4 is a block diagram illustrating example architecture for a server.

FIG. 4 is a block diagram illustrating example architecture for the server 110. The server 110 can include at least one processor 405 (e.g., a central processing unit) coupled to memory elements 410 through a system bus 415 or other suitable circuitry. As such, the server 110 can store program code within the memory elements 410. The processor 405 can execute the program code accessed from the memory elements 410 via the system bus 415. It should be appreciated that the server 110 can be implemented in the form of any system including a processor and memory that is capable of performing the functions and/or operations described within this specification. For example, the server 110 can be implemented as one or more computers.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. In one arrangement, the bulk storage device(s) 425 can be distinct from, but communicatively linked to, the server 110. The server 110 also can include one or more cache memories (not shown) that provide temporary storage of at least some program code in order to reduce the number of times program code must be retrieved from the bulk storage device 425 during execution.

One or more network adapters 430 also can be coupled to server 110 to enable server 110 to become coupled to other systems, computer systems, remote printers, and/or remote storage devices through intervening private or public networks. Modems, cable modems, transceivers, and Ethernet cards are examples of different types of network adapters 430 that are known to those skilled in the art.

As pictured in FIG. 4, the memory elements 410 can store the components of the systems 100, 200, 300 of FIGS. 1, 2 and 3, namely the feedback application 182, the voice sample 162 (or voice samples 362) and the quiet zone information 312. Being implemented in the form of executable program code, these components of the server 110 can be executed by the server 110 and, as such, can be considered part of the server 110. Moreover, the feedback application 182, voice sample 162 (or voice samples 362) and quiet zone information 312 are functional data structures that impart functionality when employed as part of the server 110. Other data structures processed by the server 110, for example the feedback 190 (FIG. 1) and detected audio 264 (FIGS. 2 and 3) also are functional data structures that impart functionality when processed by the server 110.

Figure 5:
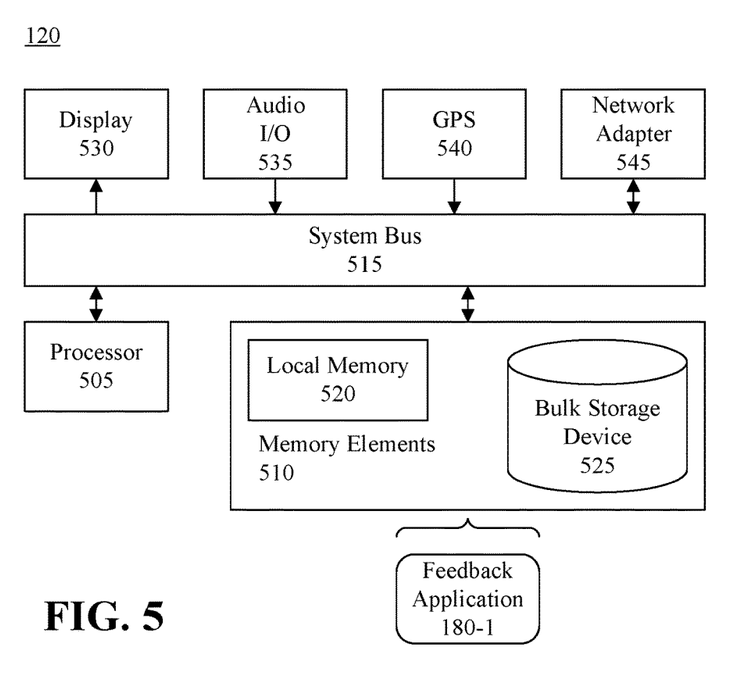
FIG. 5 is a block diagram illustrating example architecture for a mobile communication device.

FIG. 5 is a block diagram illustrating example architecture for the mobile communication device 120. The mobile communication device 130 and presenter communication device 150 can include similar architecture.

The mobile communication device 120 can include at least one processor 505 (e.g., a central processing unit) coupled to memory elements 510 through a system bus 515 or other suitable circuitry. As such, the mobile communication device 120 can store program code within the memory elements 510. The processor 505 can execute the program code accessed from the memory elements 510 via the system bus 515. It should be appreciated that the mobile communication device 120 can be implemented in the form of any system including a processor and memory that is capable of performing the functions and/or operations described within this specification.

The memory elements 510 can include one or more physical memory devices such as, for example, local memory 520 and one or more bulk storage devices 525. Input/output (I/O) devices such as a display 530, audio I/O devices (e.g., one or more microphones, speakers, etc.), and a GPS receiver 540 (or other location determining device). The I/O devices can be coupled to the mobile communication device 120 either directly or through intervening I/O controllers. For example, the display 530 can be coupled to the mobile communication device 120 via a graphics processing unit (GPU), which may be a component of the processor 505 or a discrete device. One or more network adapters 545 also can be coupled to mobile communication device 120 to enable mobile communication device 120 to become coupled to other systems, computer systems, remote printers, and/or remote storage devices through intervening private or public networks.

As pictured in FIG. 5, the memory elements 510 can store the components of the mobile communication device of FIGS. 1, 2 and 3, namely the feedback application 180-1. Being implemented in the form of executable program code, the feedback application 180-1 can be executed by the mobile communication device 120 and, as such, can be considered part of the mobile communication device 120. Moreover, the feedback application 180-1 is a functional data structure that imparts functionality when employed as part of the mobile communication device 120. Other data structures processed by the mobile communication device 120, for example the voice sample 162, also are functional data structures that impart functionality when processed by the mobile communication device 120.

Figure 6:
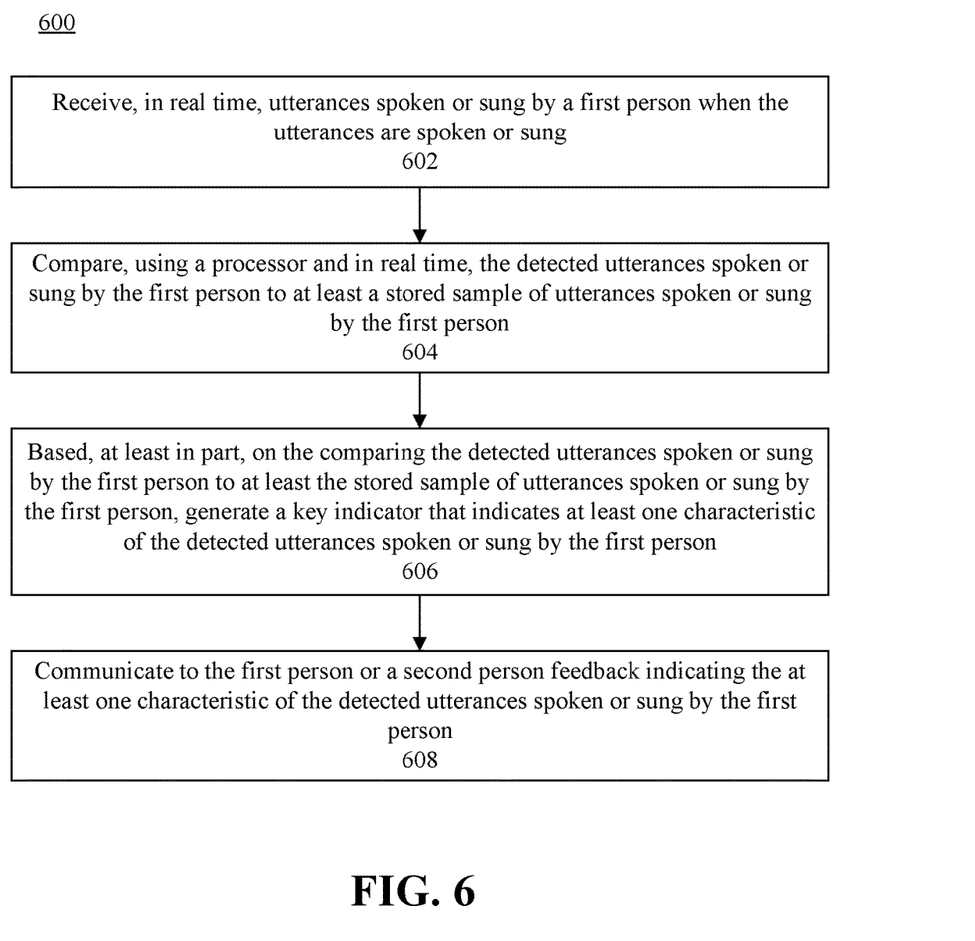
FIG. 6 is a flow chart illustrating an example of a method of dynamically providing to a person feedback pertaining to utterances spoken or sung by the person.

FIG. 6 is a flow chart illustrating an example of a method 600 of dynamically providing to a person feedback pertaining to utterances spoken or sung by the person. At step 602, utterances spoken or sung by a first person can be received, in real time, when the utterances are spoken or sung. At step 604, the detected utterances spoken or sung by the first person can be compared, using a processor and in real time, to at least a stored sample of utterances spoken or sung by the first person. At step 606, based, at least in part, on the comparing the detected utterances spoken or sung by the first person to at least the stored sample of utterances spoken or sung by the first person, a key indicator can be generated that indicates at least one characteristic of the detected utterances spoken or sung by the first person. At step 608, feedback indicating the at least one characteristic of the detected utterances spoken or sung by the first person can be communicated to the first person or a second person.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, in real time, from a mobile communication device, utterances spoken or sung by a first person, wherein the mobile communication device detects the utterances spoken or sung by the first person when the utterances are spoken or sung;
   determining that a location of the mobile communication device is in an area designated as a quiet zone;
   generating, using a processor, a key indicator that indicates at least one characteristic of the detected utterances spoken or sung by the first person;
   based, at least in part, on the key indicator, determining that the first person is speaking or singing too loudly in the area designated as the quiet zone; and
   responsive to determining that the first person is speaking or singing too loudly in the area designated as the quiet zone, communicating to the mobile communication device feedback indicating that the first person is speaking or singing too loudly in the area designated as the quiet zone, wherein the mobile communication device is configured to present the feedback to the first person or a second person.

2. The method of claim 1, wherein the key indicator indicates an audio volume of the detected utterances spoken or sung by the first person, the method further comprising:
   comparing the key indicator to a threshold value for a maximum volume level assigned to the area designated as the quiet zone;
   wherein determining that the first person is speaking or singing too loudly in the area designated as the quiet zone comprises determining that the audio volume of the detected utterances spoken or sung by the first person is above the threshold value.

3. The method of claim 1, wherein the mobile communication device is configured to present the feedback indicating that the first person is speaking or singing too loudly in the area designated as the quiet zone via a haptic response.

4. The method of claim 1, wherein the mobile communication device is configured to present the feedback indicating that the first person is speaking or singing too loudly in the area designated as the quiet zone via a an audible notification.

5. The method of claim 1, wherein the mobile communication device is configured to present the feedback indicating that the first person is speaking or singing too loudly in the area designated as the quiet zone via a user interface of the mobile communication device.

6. The method of claim 1, further comprising:
   comparing, in real time, the detected utterances spoken or sung by the first person to at least a stored sample of utterances spoken or sung by the first person; and
   based, at least in part, on the comparing the detected utterances spoken or sung by the first person to at least the stored sample of utterances spoken or sung by the first person, identifying the first person.

7. The method of claim 1, further comprising:
   automatically designating the area in which the mobile communication device is located as the quiet zone based on determining that another person is designated as a presenter in that area.

8. A system, comprising:
   a processor programmed to initiate executable operations comprising:
   receiving, in real time, from a mobile communication device, utterances spoken or sung by a first person, wherein the mobile communication device detects the utterances spoken or sung by the first person when the utterances are spoken or sung;
   determining that a location of the mobile communication device is in an area designated as a quiet zone;
   generating a key indicator that indicates at least one characteristic of the detected utterances spoken or sung by the first person;
   based, at least in part, on the key indicator, determining that the first person is speaking or singing too loudly in the area designated as the quiet zone; and
   responsive to determining that the first person is speaking or singing too loudly in the area designated as the quiet zone, communicating to the mobile communication device feedback indicating that the first person is speaking or singing too loudly in the area designated as the quiet zone, wherein the mobile communication device is configured to present the feedback to the first person or a second person.

9. The system of claim 8, wherein the key indicator indicates an audio volume of the detected utterances spoken or sung by the first person, the executable operations further comprising:
comparing the key indicator to a threshold value for a maximum volume level assigned to the area designated as the quiet zone;
wherein determining that the first person is speaking or singing too loudly in the area designated as the quiet zone comprises determining that the audio volume of the detected utterances spoken or sung by the first person is above the threshold value.

10. The system of claim 8, wherein the mobile communication device is configured to present the feedback indicating that the first person is speaking or singing too loudly in the area designated as the quiet zone via a haptic response.

11. The system of claim 8, wherein the mobile communication device is configured to present the feedback indicating that the first person is speaking or singing too loudly in the area designated as the quiet zone via a an audible notification.

12. The system of claim 8, wherein the mobile communication device is configured to present the feedback indicating that the first person is speaking or singing too loudly in the area designated as the quiet zone via a user interface of the mobile communication device.

13. The system of claim 8, the executable operations further comprising:
comparing, in real time, the detected utterances spoken or sung by the first person to at least a stored sample of utterances spoken or sung by the first person; and
based, at least in part, on the comparing the detected utterances spoken or sung by the first person to at least the stored sample of utterances spoken or sung by the first person, identifying the first person.

14. The system of claim 8, the executable operations further comprising:
automatically designating the area in which the mobile communication device is located as the quiet zone based on determining that another person is designated as a presenter in that area.

15. A computer program product comprising a computer readable storage medium having program code stored thereon, the program code executable by a processor to perform a method comprising:
receiving, in real time, from a mobile communication device, utterances spoken or sung by a first person, wherein the mobile communication device detects the utterances spoken or sung by the first person when the utterances are spoken or sung;
determining that a location of the mobile communication device is in an area designated as a quiet zone;
generating, by the processor, a key indicator that indicates at least one characteristic of the detected utterances spoken or sung by the first person;
based, at least in part, on the key indicator, determining that the first person is speaking or singing too loudly in the area designated as the quiet zone; and
responsive to determining that the first person is speaking or singing too loudly in the area designated as the quiet zone, communicating to the mobile communication device feedback indicating that the first person is speaking or singing too loudly in the area designated as the quiet zone, wherein the mobile communication device is configured to present the feedback to the first person or a second person.

16. The computer program product of claim 15, wherein the key indicator indicates an audio volume of the detected utterances spoken or sung by the first person, the method further comprising:
comparing the key indicator to a threshold value for a maximum volume level assigned to the area designated as the quiet zone;
wherein determining that the first person is speaking or singing too loudly in the area designated as the quiet zone comprises determining that the audio volume of the detected utterances spoken or sung by the first person is above the threshold value.

17. The computer program product of claim 15, wherein the mobile communication device is configured to present the feedback indicating that the first person is speaking or singing too loudly in the area designated as the quiet zone via a haptic response.

18. The computer program product of claim 15, wherein the mobile communication device is configured to present the feedback indicating that the first person is speaking or singing too loudly in the area designated as the quiet zone via a an audible notification.

19. The computer program product of claim 15, wherein the mobile communication device is configured to present the feedback indicating that the first person is speaking or singing too loudly in the area designated as the quiet zone via a user interface of the mobile communication device.

20. The computer program product of claim 15, the method further comprising:
comparing, in real time, the detected utterances spoken or sung by the first person to at least a stored sample of utterances spoken or sung by the first person; and
based, at least in part, on the comparing the detected utterances spoken or sung by the first person to at least the stored sample of utterances spoken or sung by the first person, identifying the first person.

\* \* \* \* \*